United States Patent
Wang et al.

(10) Patent No.: US 10,833,805 B2
(45) Date of Patent: Nov. 10, 2020

(54) BISS PROTOCOL DATA DECODING METHOD AND INTERFACE SYSTEM

(71) Applicant: GUANGDONG UNIVERSITY OF TECHNOLOGY, Guangzhou (CN)

(72) Inventors: Han Wang, Guangdong (CN); Fangjian Zhang, Guangdong (CN); Xin Chen, Guangdong (CN); Xindu Chen, Guangdong (CN); Nian Cai, Guangdong (CN); Yunbo He, Guangdong (CN); Yixiang Zhao, Guangdong (CN); Canran Lin, Guangdong (CN); Zhengyi Xin, Guangdong (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 54 days.

(21) Appl. No.: 16/333,245

(22) PCT Filed: Mar. 14, 2018

(86) PCT No.: PCT/CN2018/078940
§ 371 (c)(1),
(2) Date: Mar. 14, 2019

(87) PCT Pub. No.: WO2018/196498
PCT Pub. Date: Nov. 1, 2018

(65) Prior Publication Data
US 2019/0238269 A1    Aug. 1, 2019

(30) Foreign Application Priority Data
Apr. 27, 2017    (CN) .......................... 2017 1 0287684

(51) Int. Cl.
*H03M 13/00*    (2006.01)
*G06F 11/10*    (2006.01)
(Continued)

(52) U.S. Cl.
CPC ........ *H04L 1/0061* (2013.01); *G06F 13/4291* (2013.01); *H04L 69/06* (2013.01);
(Continued)

(58) Field of Classification Search
None
See application file for complete search history.

(56) References Cited

FOREIGN PATENT DOCUMENTS

| CN | 105119907 A | 12/2015 |
|----|-------------|---------|
| CN | 105389286 A | 3/2016 |
| CN | 107124412 A | 9/2017 |

OTHER PUBLICATIONS

International Search Report for PCT/CN2018/078940 dated May 30, 2018, ISA/CN.
(Continued)

*Primary Examiner* — Guerrier Merant
(74) *Attorney, Agent, or Firm* — Yue (Robert) Xu; Apex Attorneys at Law, LLP

(57) ABSTRACT

There are provided a method and an interface system for Bidirectional Synchronous Serial (BISS) protocol data decoding. The method includes: an MA drive module receiving an enable signal en and transmitting an MA clock signal to an SL receiving module, and then the SL receiving module detecting a trigger signal of SL; when a start bit of the SL is detected by the SL receiving module, the SL receiving module reading SL data; after the SL data is read, the SL receiving module transmitting a done signal to the MA drive module to stop operation of the MA drive module and transmitting a did signal to a CRC check module; and after the did signal is received by the CRC check module, the CRC check module performing CRC check on the SL data and outputting a correct position value after the check is completed.

8 Claims, 6 Drawing Sheets

(51) Int. Cl.
  *H04L 1/00*   (2006.01)
  *G06F 13/42*  (2006.01)
  *H04L 29/06*  (2006.01)
  *G01B 11/00*  (2006.01)
  *G01D 5/34*   (2006.01)

(52) U.S. Cl.
  CPC .............. *H04L 69/08* (2013.01); *G01B 11/00* (2013.01); *G01D 5/34* (2013.01)

(56) References Cited

OTHER PUBLICATIONS

Wang, Xiyuan, et al., Research and realization of BiSS-C protocol encoder interface based on FPGA, Chinese Journal of Liquid Crystals and Displays, Apr. 30 2016, vol. 31 No. 4, pp. 386-391.
Zhang, Fangjian, et al., Design and Implementation of Absolute Grating Interface Communication Based on FPGA, Instrument Technique and Sensor, Jan. 31 2018, No. 1, pp. 36-40.
Bidirectional Synchronous Serial (BISS) protocol.

BISS PROTOCOL DATA DECODING METHOD AND INTERFACE SYSTEM

This application is the national phase of PCT International Patent Application PCT/CN2018/078940, filed on Mar. 14, 2018 which claims the priority to Chinese Patent Application No. 201710287684.1, titled "BISS PROTOCOL DATA DECODING METHOD AND INTERFACE SYSTEM", filed on Apr. 27, 2017 with the Chinese Patent Office, both of which are incorporated herein by reference in their entireties.

FIELD

The present disclosure relates to the field of BISS protocol data decoding, and in particular to a method and an interface system for BISS protocol data decoding.

BACKGROUND

In numerical control systems, grating rulers are core components in position measurement devices. The grating ruler is a linear displacement sensor having high precision, in which an optical signal is converted into an electrical signal by a photoelectric sensor with a measurement reference served by a high-precision long grating, and then the electrical signal is processed to obtain position information. Compared with other linear displacement sensors (such as magnetic grids, ball grids, laser interferometers), the grating rulers have higher comprehensive advantages in some aspects such as measurement precision, resolution, reliability, requirements for application environment, and price. Therefore, the grating rulers are widely applied in digital display, numerical control machine tools and measurement instruments. The grating rulers may be classified into incremental grating rulers and absolute grating rulers according to different measurement principles.

With the absolute grating ruler, absolute position information is obtained by reading a position code. Every time the absolute grating ruler is started, current absolute position information of axles of a machine tool can be immediately obtained by reading current position codes without performing zeroing operation on the absolute grating ruler. In this case, the machine tool may immediately enter into a machining state or continue the previous operation, which improves machining efficiency of the machine tool. The absolute grating ruler is widely applied in the numerical control machine tools and gradually becomes a mainstream trend. Therefore, it is required to develop a data interface that can be adaptive to data receiving requirements of the absolute grating ruler, such as high speed, large amount of data and high-stability.

The Bidirectional Synchronous Serial (BISS) protocol is a new-type synchronous serial communication protocol proposed by the IC-Haus company in Germany, which can be freely used. A baud rate of the BISS protocol is in a wide range, which is up to 10 MHz, higher than baud rates of other common communication protocols (such as SSI, EnDat, Hiperface). Further, the BISS protocol has alarm bits, and a time length of the protocol can be adjusted, which is better applied in industries and has no problem on property rights. In addition, a master port measures a transmission delay of a line and performs automatic compensation for the transmission delay of the line, so that the communication interface may perform high-speed data transmission. A sensor is allowed to have time for data acquisition and data processing (delayed transmission). Only two signal lines MA and SL are included.

The BISS protocol may be used in two modes including a "Sensor Mode" and a "Register Mode". In the Sensor Mode, the interface quickly reads information such as position values of an encoder. In the Register Mode, the interface and the encoder perform bidirectional reading and writing operations to obtain information needed by the interface. Which mode is selected mainly based on a time length of a first low level of the MA line in a communication period. In a case that the time length is greater than a time length indicated by "timeoutSENS", it is indicated that the communication is then performed in the Register Mode. In a case that the time length is less than the "timeoutSENS", it is indicated that the communication is then performed in the Sensor Mode. The interface receives the data mainly in the Sensor Mode.

A decoding method commonly applied in the BISS protocol is performed by using an official chip BISS Mater of the IC-Haus company, a single chip microcontroller or an FPGA. In the method performed by using the official chip BISS Mater, the cost of the chip is high, the data processing is inflexible, and functions of modules are not easily expanded. The data decoding performed by using the single chip microcontroller is often subject to performance of the single chip microcontroller. In the data decoding performed by using the FPGA, achieved functions are relatively simple, and there are still some deficiencies.

SUMMARY

There are provided a method and an interface system for BISS protocol data decoding according to embodiments of the present disclosure, to solve technical problems in the conventional technology that data cannot be flexibly processed and multiple different functions cannot be provided by using a common decoding method for a BISS protocol applied to an absolute grating ruler.

A method for BISS protocol data decoding is provided according to an embodiment of the present disclosure. The method is performed by an FPGA chip including an MA drive module, an SL receiving module and a CRC check module. The method includes:
receiving, by the MA drive module, an enable signal en;
transmitting, by the MA drive module, an MA clock signal to the SL receiving module;
detecting a trigger signal of SL by the SL receiving module;
reading SL data by the SL receiving module on detecting a start bit of the SL by the SL receiving module;
transmitting, by the SL receiving module, a done signal to the MA drive module to stop operation of the MA drive module and transmitting, by the SL receiving module, a did signal to the CRC check module, after the SL data is read by the SL receiving module;
performing, by the CRC check module, CRC check on the SL data after the did signal is received by the CRC check module; and
outputting, by the CRC check module, a correct position value after the check is completed.

Optionally, receiving by the MA drive module the enable signal en, transmitting by the MA drive module the MA clock signal to the SL receiving module, and detecting the trigger signal of the SL by the SL receiving module comprises:
receiving, by the MA drive module, the enable signal en;

transmitting, by the MA drive module, the MA clock signal to the SL receiving module;

generating, by the SL receiving module, a maclk signal based on a time difference between the MA clock signal and an SL signal; and detecting, by the SL receiving module, the trigger signal of the SL by using a rising edge of the maclk signal.

Optionally, generating by the SL receiving module the maclk signal based on the time difference between the MA clock signal and the SL signal and detecting by the SL receiving module the trigger signal of the SL by using the rising edge of the maclk signal comprises:

generating, by the SL receiving module, the maclk signal based on a time difference between a second rising edge of the MA clock signal and a first falling edge of the SL signal; and detecting, by the SL receiving module, the trigger signal of the SL by using the rising edge of the maclk signal.

Optionally, detecting the start bit of the SL and reading the SL data by the SL receiving module, and transmitting by the SL receiving module the done signal to the MA drive module to stop the operation of the MA drive module and transmitting by the SL receiving module the did signal to the CRC check module after the SL data is read by the SL receiving module comprises:

detecting, by the SL receiving module, the start bit of the SL;

reading a level value of the SL and storing the level value in a register by the SL receiving module; and transmitting, by the SL receiving module, the done signal to the MA drive module to stop the operation of the MA drive module and transmitting, by the SL receiving module, the did signal to the CRC check module, after all bits of the level value of the SL are read by the SL receiving module.

Optionally, performing by the CRC check module the CRC check on the SL data after the did signal is received by the CRC check module and outputting by the CRC check module the correct position value after the check is completed comprises:

performing, by the CRC check module, the CRC check for correctness of the SL data after the did signal is received by the CRC check module; and outputting, by the CRC check module, the SL data in a case that the SL data passes the check or outputting, by the CRC check module, a previous correct data value in a case that the SL data does not pass the check, after the check is completed.

An interface system for BISS protocol data decoding is provided according to an embodiment of the present disclosure. The interface system includes: an FPGA chip connected to an encoder. The FPGA chip includes: an MA drive module, an SL receiving module and a CRC check module;

the MA drive module is connected to the SL receiving module, and the SL receiving module is connected to the CRC check module;

the MA drive module is configured to receive an enable signal en and transmit an MA clock signal to the SL receiving module;

the SL receiving module is configured to: after the MA clock signal is received by the SL receiving module, detect a trigger signal of SL; when a start bit of the SL is detected by the SL receiving module, read SL data; and after the SL data is read by the SL receiving module, transmit a done signal to the MA drive module to stop operation of the MA drive module and transmit a did signal to the CRC check module; and the CRC check module is configured to: perform CRC check on the SL data after the did signal is received by the CRC check module; and output a correct position value after the check is completed.

Optionally, the SL receiving module includes: a signal generation unit. The signal generation unit is configured to: generate a maclk signal based on a time difference between the MA clock signal and an SL signal, and detect the trigger signal of the SL by using a rising edge of the maclk signal.

Optionally, the signal generation unit includes a signal generation sub-unit. The signal generation sub-unit is configured to: generate the maclk signal based on a time difference between a second rising edge of the MA clock signal and a first falling edge of the SL signal, and detect the trigger signal of the SL by using the rising edge of the maclk signal.

Optionally, the SL receiving module further includes a reading unit. The reading unit is configured to: when the start bit of the SL is detected, read a level value of the SL and store the level value in a register; and after all bits of the level value of the SL are read, transmit the done signal to the MA drive module to stop the operation of the MA drive module and transmit the did signal to the CRC check module.

Optionally, the CRC check module includes a check unit. The check unit is configured to: after the did signal is received, perform the CRC check for correctness of the SL data; and after the check is completed, output the SL data in a case that the SL data passes the CRC check, or output a previous correct data value in a case that the SL data does not pass the CRC check.

It can be known from the technical solutions described above that the embodiments of the present disclosure have the following advantages.

There are provided a method and an interface system for BISS protocol data decoding according to the embodiments of the present disclosure. The method is performed by an FPGA chip including an MA drive module, an SL receiving module and a CRC check module. The method includes: receiving, by the MA drive module, an enable signal en; transmitting, by the MA drive module, an MA clock signal to the SL receiving module; detecting a trigger signal of SL by the SL receiving module; reading SL data by the SL receiving module on detecting a start bit of the SL by the SL receiving module; transmitting, by the SL receiving module, a done signal to the MA drive module to stop operation of the MA drive module and transmitting, by the SL receiving module, a did signal to the CRC check module, after the SL data is read by the SL receiving module; performing, by the CRC check module, CRC check on the SL data after the did signal is received by the CRC check module; and outputting, by the CRC check module, a correct position value after the check is completed. In the embodiments of the present disclosure, a protocol for an absolute grating ruler based on the BISS protocol is decoded by using the FPGA chip, and the FPGA chip is provided with the MA drive module, the SL receiving module and the CRC check module, so that functions such as data length and time length adjustment and CRC check are added. Further, mass data can be stably received at a high speed by using the interface system according to the embodiment of the present disclosure, which is adapted to information transmission of the absolute grating ruler, and solves the technical problems in the conventional technology that the data cannot be flexibly processed and multiple different functions cannot be provided by using a common decoding method for a BISS protocol applied to an absolute grating ruler.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

There are provided a method and an interface system for BISS protocol data decoding according to embodiments of the present disclosure, to solve technical problems in the conventional technology that data cannot be flexibly processed and multiple different functions cannot be provided by using a common decoding method for a BISS protocol applied to an absolute grating ruler.

In order to make objects, features and advantages of the present disclosure clearer and easier to be understood, technical solutions in the embodiments of the present disclosure are clearly and completely described below in conjunction with the drawings in the embodiments of the present disclosure. It is apparent that the embodiments described hereinafter are only some embodiments of the present disclosure, rather than all the embodiments. All other embodiments obtained by those skilled in the art based on the embodiments of the present disclosure without any creative work fall into the protection scope of the present disclosure.

Figure 1:
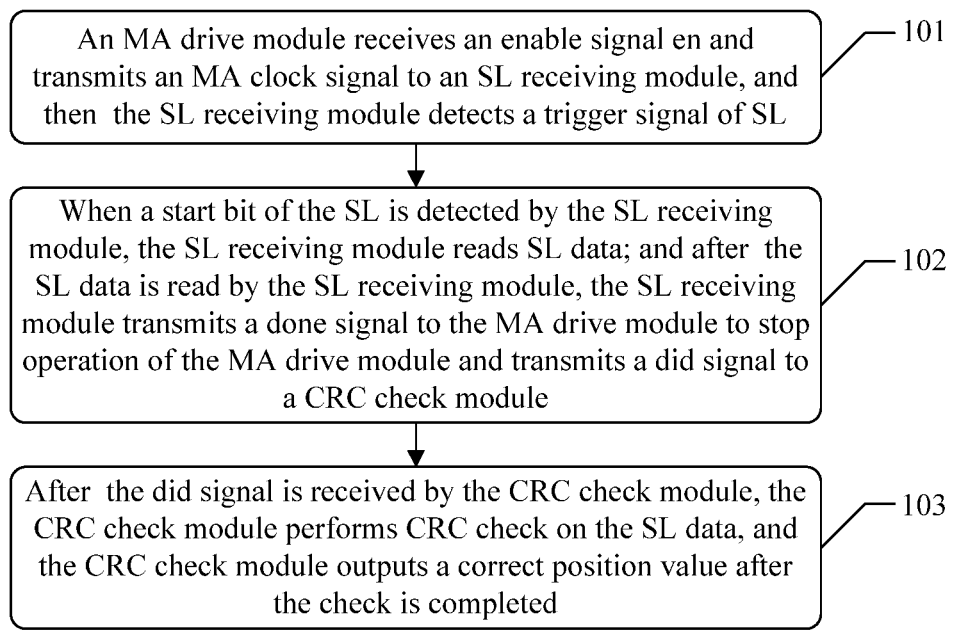
FIG. 1 is a schematic flowchart of a method for BISS protocol data decoding according to an embodiment of the present disclosure.

Reference is made to FIG. 1. A method for BISS protocol data decoding is provided according to an embodiment of the present disclosure.

The method is performed by an FPGA chip including an MA drive module, an SL receiving module and a CRC check module. The method includes the following steps 101 to 103.

In step 101, the MA drive module receives an enable signal en, and transmits an MA clock signal to the SL receiving module, and the SL receiving module detects a trigger signal of SL.

Firstly, the MA drive module receives the enable signal en and transmits the MA clock signal to the SL receiving module. Then, the SL receiving module detects the trigger signal of the SL.

In step 102, when a start bit of the SL is detected by the SL receiving module, the SL receiving module reads SL data; and after the SL data is read by the SL receiving module, the SL receiving module transmits a done signal to the MA drive module to stop operation of the MA drive module and transmits a did signal to the CRC check module.

When the start bit of the SL is detected by the SL receiving module, the SL receiving module reads the SL data. After the SL data is read by the SL receiving module, the SL receiving module transmits the done signal to the MA drive module to stop the operation of the MA drive module and transmits the did signal to the CRC check module.

In step 103, after the did signal is received by the CRC check module, the CRC check module performs CRC check on the SL data, and the CRC check module outputs a correct position value after the check is completed.

After the did signal is received by the CRC check module, the CRC check module performs the CRC check on the SL data. After the check is completed, the CRC check module outputs a correct position value.

The method for BISS protocol data decoding according to the embodiment of the present disclosure is described above in detail. A method for BISS protocol data decoding is further provided according to another embodiment of the present disclosure, which is described in detail hereinafter.

Figure 2:
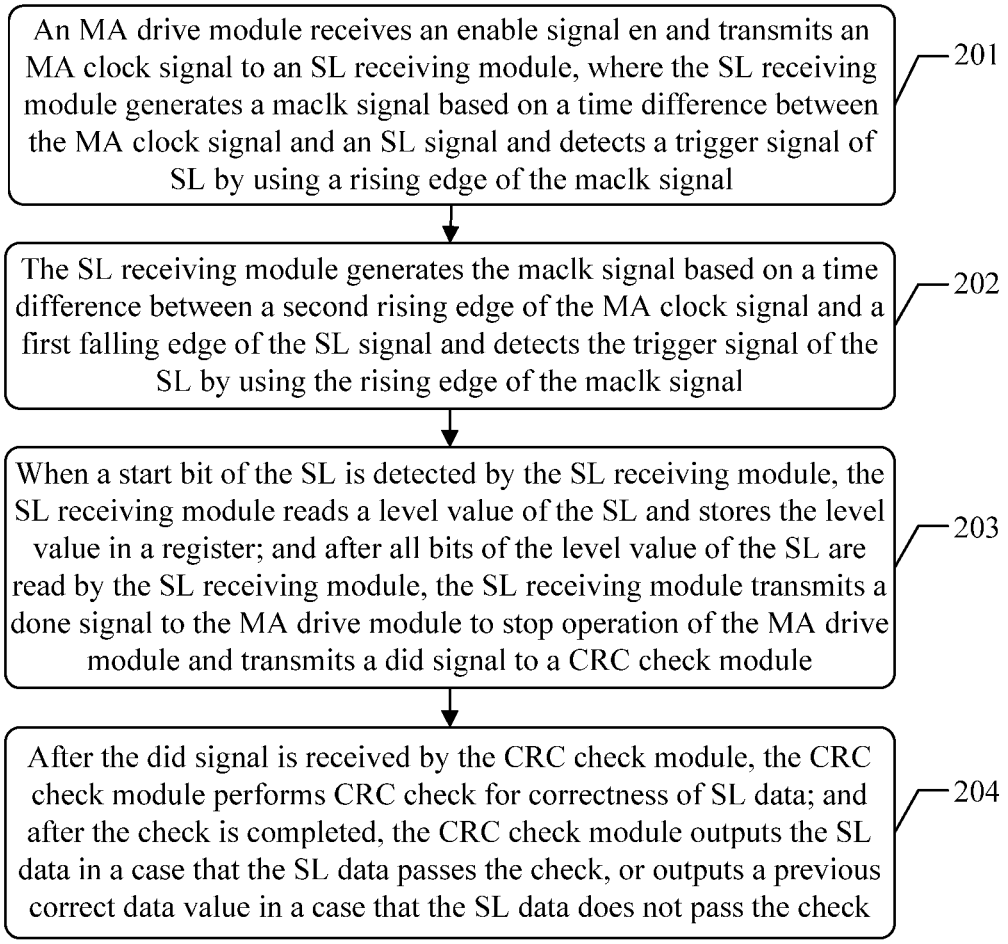
FIG. 2 is a schematic flowchart of a method for BISS protocol data decoding according to another embodiment of the present disclosure.

Reference is made to FIG. 2. A method for BISS protocol data decoding according to another embodiment of the present disclosure includes the following steps 201 to 204.

In step 201, the MA drive module receives an enable signal en and transmits an MA clock signal to the SL receiving module, where the SL receiving module generates a maclk signal based on a time difference between the MA clock signal and an SL signal and detects a trigger signal of SL by using a rising edge of the maclk signal.

After the enable signal en is received by the MA drive module, the MA drive module transmits the MA clock signal to the SL receiving module, where the SL receiving module generates the maclk signal based on the time difference between the MA clock signal and the SL signal and detects the trigger signal of the SL by using the rising edge of the maclk signal.

In step 202, the SL receiving module generates the maclk signal based on a time difference between a second rising edge of the MA clock signal and a first falling edge of the SL signal and detects the trigger signal of the SL by using the rising edge of the maclk signal.

In order to compensate for a time delay of the SL signal, the SL receiving module may generate the maclk signal based on the time difference between the second rising edge of the MA clock signal and the first falling edge of the SL signal, and detect the trigger signal of the SL by using the rising edge of the maclk signal.

In step 203, when a start bit of the SL is detected by the SL receiving module, the SL receiving module reads a level value of the SL and stores the level value in a register; and after all bits of the level value of the SL are read by the SL receiving module, the SL receiving module transmits a done signal to the MA drive module to stop operation of the MA drive module and transmits a did signal to the CRC check module.

When the start bit of the SL is detected by the SL receiving module, the SL receiving module reads the level value of the SL and stores the level value in the register.

After all bits of the level value of the SL are read by the SL receiving module, the SL receiving module transmits the done signal to the MA drive module to stop the operation of the MA drive module and transmits the did signal to the CRC check module.

In step 204, after the did signal is received by the CRC check module, the CRC check module performs CRC check for correctness of SL data; and after the check is completed, the CRC check module outputs the SL data in a case that the SL data passes the check, or outputs a previous correct data value in a case that the SL data does not pass the check.

After the did signal transmitted by the SL receiving module is received by the CRC check module, the CRC check module performs the CRC for the correctness of the SL data. After the check is completed, the CRC check module outputs the SL data in the case that the SL data passes the check, or outputs the previous correct data value in the case that the SL data does not pass the check.

The method for BISS protocol data decoding according to the embodiment of the present disclosure is described above in detail. For ease of understanding, specific operation principles and steps of the method for BISS protocol data decoding according to the embodiments of the present disclosure are described in detail hereinafter.

Figure 3:
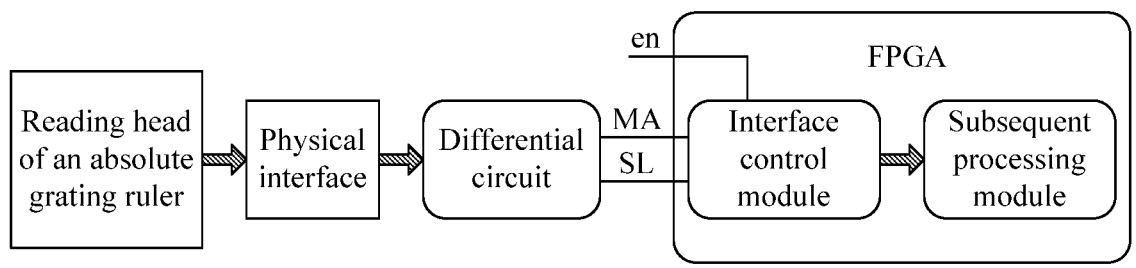
FIG. 3 is a schematic diagram showing connections between external structures and an interface system for BISS protocol data decoding according to an embodiment of the present disclosure.

Reference is made to FIG. 3, which is a schematic diagram showing connections between external structures and an interface system for BISS protocol data decoding according to an embodiment of the present disclosure. An encoder (i.e., a reading head of an absolute grating ruler) transmits a data result to a differential circuit via a physical interface. The data result is transmitted to an FPGA chip via the differential circuit. In this embodiment, the BISS sensor mode is adopted for communication. A signal of the reading head of the absolute grating ruler is usually transmitted in a form of differential information. The information can be stably transmitted by using a differential receiving circuit. An SL signal is transmitted from the reading head of the absolute grating ruler after a differential process. An inverse differential circuit mainly including a differential chip receives the signal and restores the SL signal required by the FPGA chip. Further, An MA signal is transmitted via a pin of the FPGA chip, and is transmitted to the reading head of the grating ruler after being processed by the differential circuit. One of input pins of the FPGA chip is used to control operation of an interface control module. In a case that the interface control module operates and obtains a position value, the information is transmitted to a subsequent module.

Figure 4:
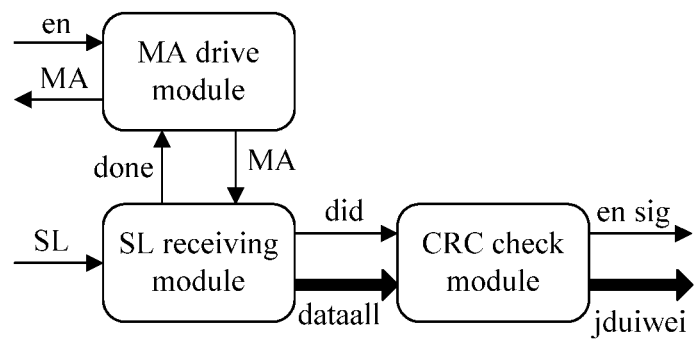
FIG. 4 is a schematic diagram showing an FPGA chip according to an embodiment of the present disclosure.

Reference is made to FIG. 4. The FPGA chip may be designed to include an MA drive module, an SL receiving module and a CRC check module according to a from-top-to-bottom module design principle of the FPGA and system function requirements. In practical applications, a data interface section is used as a control section to control a module that is controlled by the control section to transmit a pulse as a clock. An encoder may transmit data via the pulse. In the BISS protocol, a time length of a data transmission cycle may be flexibly adjusted according to actual requirements. Time lengths of different data transmission cycles may be different, which are decided by the encoder.

The MA drive module cooperates with the SL receiving module by an MA line and a done line. The MA signal is controlled by the MA drive module. The done signal is controlled by the SL receiving module and is transmitted by the SL receiving module to the MA drive module. The SL receiving module reads data transmitted by a reading head of a grating ruler, controls a total length of the MA clock by the done line, and controls the subsequent CRC check module based on the obtained position value and the did line.

When a start enable signal en arrives, the MA drive module transmits an MA clock signal. When a response signal from the encoder is received by the SL receiving module, the SL receiving module counts the delay time and waits for the start bit. After the start bit is detected by the SL receiving module, the SL receiving module receives the SL data. After the SL data is received by the SL receiving module, the SL receiving module transmits the did signal, and transmits the done signal at a certain time to stop the operation of the MA drive module. After the did signal is received by the CRC check module, the CRC check module performs the CRC check. After the check is completed, the CRC check module outputs a correct position value.

Figure 5:
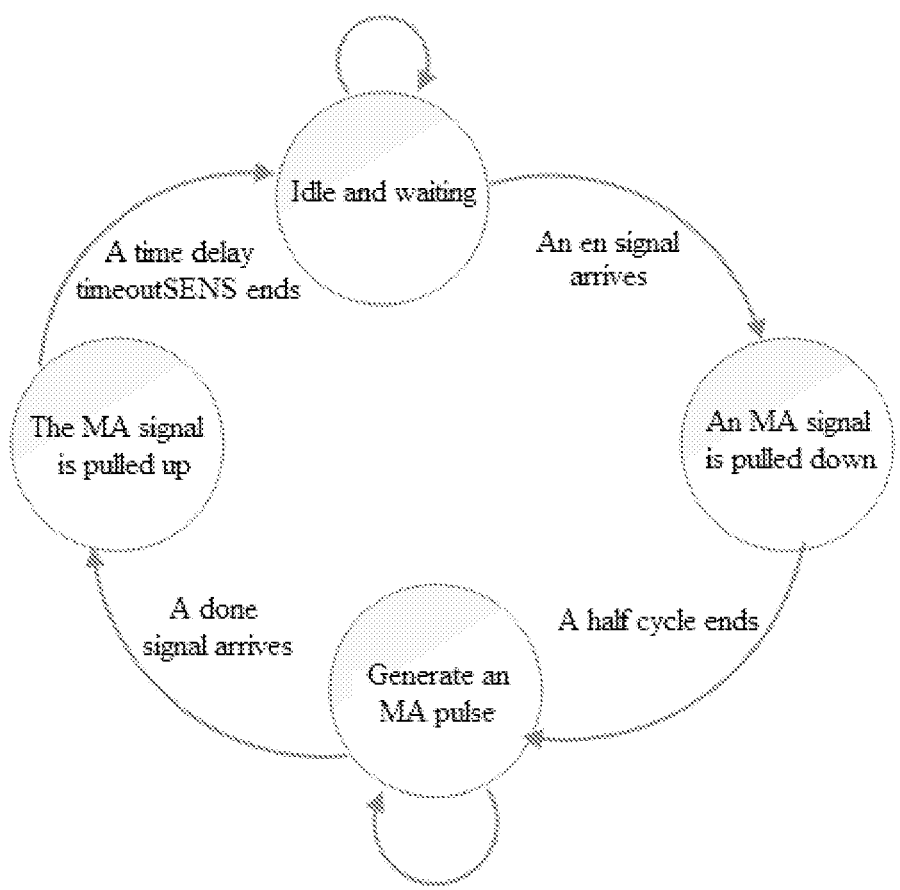
FIG. 5 is a schematic diagram showing state transition of an MA drive module according to an embodiment of the present disclosure.

Reference is made to FIG. 5, which is a schematic diagram showing state transition diagram of the MA drive module. In an idle and waiting state, that is, in a state in which data transmission is not performed, the MA signal is maintained at a high level, and the done signal is maintained at a low level. When the MA drive module receives an enable signal en from an interface module for an incremental grating ruler, the MA drive module operates and enters into a next state. In this case, the MA signal is pulled down to a low level and is maintained at the low level for a half cycle of the MA clock, so that the MA drive module enters into the next state. In this state, the MA pulse signal is generated constantly, and the MA pulse signal is inverted every half cycle of the MA clock. A signal on the done line is continuously detected while the pulse is generated. If a high level appears in the done line, the MA drive module enters into a next state in which the MA signal is maintained at a high level for a time length of timeoutSENS. The MA drive module enters into the idle and waiting state again after the above state ends.

Figure 6:
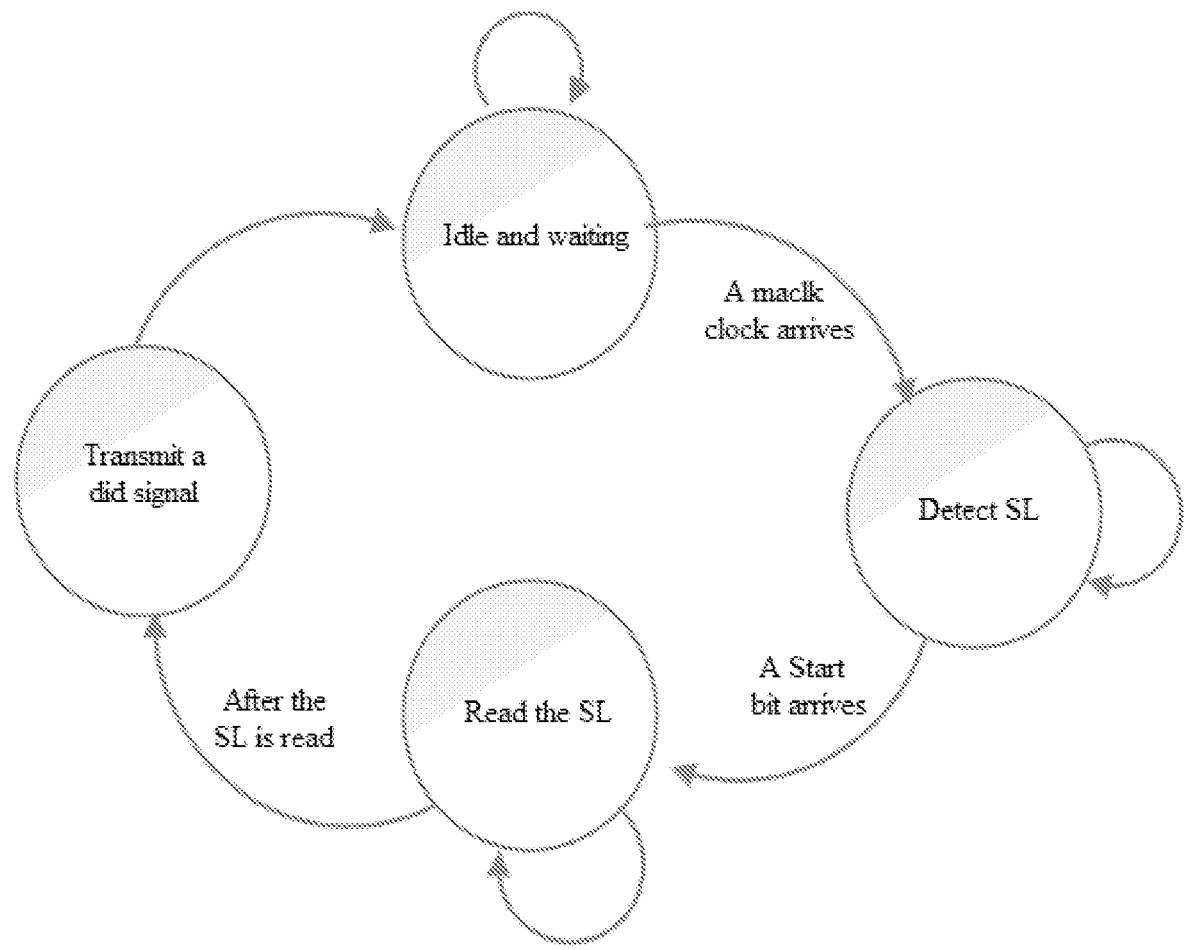
FIG. 6 is a schematic diagram showing state transition of an SL receiving module according to an embodiment of the present disclosure.

Reference is made to FIG. 6, which is a schematic diagram showing state transition of the SL receiving module. In the FPGA chip, a register having sufficient bits is designed to store data transmitted by the SL. The data includes a position value, an error bit, a check bit and the like, all of which are stored in the register. Firstly, a receiving clock signal (for example, the maclk signal) of which a time delay is compensated is generated, and the triggering of reading the SL data is detected by using a rising edge of the maclk signal. After a first falling edge of the SL signal and before the data transmission ends, each time a falling edge of the MA signal is generated, a rising edge of the maclk signal is generated after a certain delay. The delay is a time difference between a second rising edge of the MA signal and a first falling edge of the SL signal, and is used for compensating the time delay of the SL signal. The rising edge of the maclk signal is a trigger signal for reading the SL data. The SL receiving module is in an idle and waiting state before the rising edge of the maclk signal is detected. When a start bit of the SL (that is, a first signal having a level of 1 on the SL line) is detected, a clock having a high level is generated on a kaishi signal line, and the SL receiving module enters into a data reading state. A level value of the SL is read at the rising edge and is stored in a predetermined register, and counting is performed. When all bits are read, the data reading process ends, and the SL receiving module transmits a did signal to start operation of the CRC check module, and generates a done signal as a response to the MA drive module.

The CRC check module performs the check on the acquired data by using a CRC algorithm implemented by the FPGA chip. If the data passes the check, the data is outputted. If the data does not pass the check, a previous correct data value is outputted.

The SL receiving module is a main control module of the whole BISS interface. The MA drive module receives a starting signal from outside and operates firstly. The CRC check module performs the check on the received data and outputs a correct position value.

The specific operation principles and steps of the method for BISS protocol data decoding according to the embodiments of the present disclosure are described above in detail. An interface system for BISS protocol data decoding is further provided according to an embodiment of the present disclosure, which is described in detail hereinafter.

Figure 7:
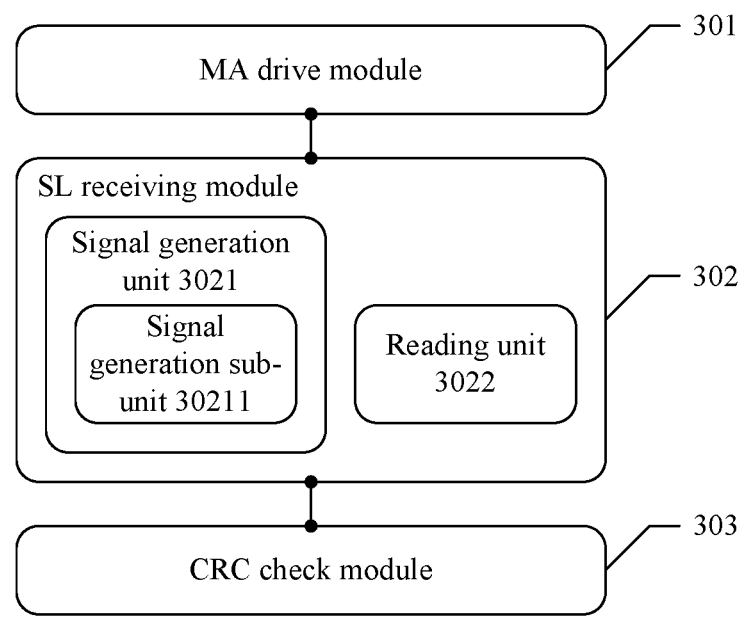
FIG. 7 is a schematic structural diagram of an interface system for BISS protocol data decoding according to an embodiment of the present disclosure.

Reference is made to FIG. 7. An interface system for BISS protocol data decoding according to an embodiment of the present disclosure includes an FPGA chip.

The FPGA chip is connected to an encoder.

The FPGA chip includes an MA drive module 301, an SL receiving module 302, and a CRC check module 303.

The MA drive module 301 is connected to the SL receiving module 302. The SL receiving module 302 is connected to the CRC check module 303.

The MA drive module 301 is configured to receive an enable signal en and transmit an MA clock signal to the SL receiving module.

The SL receiving module 302 is configured to: after the MA clock signal is received by the SL receiving module, detect a trigger signal of SL; when a start bit of the SL is detected by the SL receiving module, read SL data; and after the SL data is read by the SL receiving module, transmit a done signal to the MA drive module 301 to stop operation of the MA drive module 301 and transmit a did signal to the CRC check module 303. The SL receiving module 302 includes a signal generation unit 3021 and a reading unit 3022.

The signal generation unit 3021 is configured to: generate a maclk signal based on a time difference between the MA clock signal and an SL signal, and detect the trigger signal of the SL by using a rising edge of the maclk signal.

The signal generation unit 3021 includes a signal generation sub-unit 30211 configured to: generate the maclk signal based on a time difference between a second rising edge of the MA clock signal and a first falling edge of the SL signal, and detect the trigger signal of the SL by using the rising edge of the maclk signal.

The reading unit 3022 is configured to: when the start bit of the SL is detected, read a level value of the SL and store the level value in a register; and after all bits of the level value of the SL are read, transmit the done signal to the MA drive module 301 to stop the operation of the MA drive module 301 and transmit the did signal to the CRC check module 302.

The CRC check module 303 is configured to: after the did signal is received by the CRC check module, perform CRC check on the SL data, and output a correct position value after the check is completed.

The CRC check module 303 includes a check unit 3031 configured to: after the did signal is received, perform the CRC check for correctness of the SL data; and after the check is completed, output the SL data in a case that the SL data passes the CRC check, or output a previous correct data value in a case that the SL data does not pass the CRC check.

It should be clearly known by those skilled in the art that, for convenient and clear description, for specific operation processes of the above system, device and unit, reference may be made to the corresponding process in the above method embodiment, which is not described herein.

In the embodiments mentioned in the present disclosure, it should be understood that, the disclosed system, device and method may be implemented in other ways. For example, the above device embodiment is only illustrative. For example, the division of the units is only a logical functional division. In practice, there may be other divisions. For example, multiple units or assemblies may be combined or may be integrated into another system. Alternatively, some features may be neglected or not be performed. The displayed or discussed mutual coupling or direct coupling or communication connection may be an indirect coupling or communication connection via some interfaces, devices or units, which may be in an electrical, mechanical or other form.

The units described as separate components may be or may not be separate physically, and the components which are displayed as units may be or may not be physical units, that is, may be located at a position, or may be distributed over multiple network units. Some or all of the units may be selected as required to implement the solution of the embodiments.

Further, the functional units in the embodiments of the present disclosure may be integrated into one processing unit, and may exist physically separately, and may be integrated into one unit by two or more. The above integrated unit may be implemented in hardware, and may also be implemented by using a software functional unit.

When being implemented by using a software functional unit and being sold and used as a separate product, the integrated unit may be stored in a computer readable storage medium. Based on this, essential part or a part contributing to the prior art of the technical solution of the present disclosure or the whole or part of the technical solution may be embodied in a software product which is stored in a storage medium, including several instructions for causing a computer device (which may be a personal computer, a server, a network device or the like) to perform all or some of the steps of the method in the embodiment of the present disclosure. The storage medium includes various mediums capable of storing program codes, such as U disk, movable disk, Read-Only Memory (ROM), Random Access Memory (RAM), magnetic disk or optical disk.

As described above, the above embodiments are only intended to describe the technical solutions of the present disclosure, but not to limit the scope of the present disclosure. Although the present disclosure is described in detail with reference to the above embodiments, it should be understood by those skilled in the art that modifications can be made to the technical solutions recited in the above embodiments or equivalent replacements can be made to some or all of the technical features thereof. The modifications and equivalent replacements will not make the corresponding technical solutions deviate from the scope of the technical solutions of the embodiments of the present disclosure.

The invention claimed is:

1. A method for Bidirectional Synchronous Serial (BISS) protocol data decoding, wherein the method is performed by an FPGA chip comprising an MA drive module, an SL receiving module and a CRC check module, and the method comprises:
receiving, by the MA drive module, an enable signal en;
transmitting, by the MA drive module, an MA clock signal to the SL receiving module;

detecting a trigger signal of SL by the SL receiving module;
reading SL data by the SL receiving module on detecting a start bit of the SL by the SL receiving module;
transmitting, by the SL receiving module, a done signal to the MA drive module to stop operation of the MA drive module and transmitting, by the SL receiving module, a did signal to the CRC check module, after the SL data is read by the SL receiving module;
performing, by the CRC check module, CRC check on the SL data after the did signal is received by the CRC check module; and
outputting, by the CRC check module, a correct position value after the check is completed, wherein
receiving by the MA drive module the enable signal en, transmitting by the MA drive module the MA clock signal to the SL receiving module, and detecting the trigger signal of the SL by the SL receiving module comprises:
receiving, by the MA drive module, the enable signal en;
transmitting, by the MA drive module, the MA clock signal to the SL receiving module;
generating, by the SL receiving module, a maclk signal based on a time difference between the MA clock signal and an SL signal; and
detecting, by the SL receiving module, the trigger signal of the SL by using a rising edge of the maclk signal.

2. The method for BISS protocol data decoding according to claim 1, wherein generating by the SL receiving module the maclk signal based on the time difference between the MA clock signal and the SL signal and detecting by the SL receiving module the trigger signal of the SL by using the rising edge of the maclk signal comprises:
generating, by the SL receiving module, the maclk signal based on a time difference between a second rising edge of the MA clock signal and a first falling edge of the SL signal; and
detecting, by the SL receiving module, the trigger signal of the SL by using the rising edge of the maclk signal.

3. The method for BISS protocol data decoding according to claim 2, wherein detecting the start bit of the SL and reading the SL data by the SL receiving module, and transmitting by the SL receiving module the done signal to the MA drive module to stop the operation of the MA drive module and transmitting by the SL receiving module the did signal to the CRC check module after the SL data is read by the SL receiving module comprises:
detecting, by the SL receiving module, the start bit of the SL;
reading a level value of the SL and storing the level value in a register by the SL receiving module; and
transmitting, by the SL receiving module, the done signal to the MA drive module to stop the operation of the MA drive module and transmitting, by the SL receiving module, the did signal to the CRC check module, after all bits of the level value of the SL are read by the SL receiving module.

4. The method for BISS protocol data decoding according to claim 3, wherein performing by the CRC check module the CRC check on the SL data after the did signal is received by the CRC check module and outputting by the CRC check module the correct position value after the check is completed comprises:
performing, by the CRC check module, the CRC check for correctness of the SL data after the did signal is received by the CRC check module; and
outputting, by the CRC check module, the SL data in a case that the SL data passes the check or outputting, by the CRC check module, a previous correct data value in a case that the SL data does not pass the check, after the check is completed.

5. An interface system for Bidirectional Synchronous Serial (BISS) protocol decoding, comprising an FPGA chip connected to an encoder, wherein the FPGA chip comprises:
an MA drive module;
an SL receiving module; and
a CRC check module, wherein
the MA drive module is connected to the SL receiving module, and the SL receiving module is connected to the CRC check module;
the MA drive module is configured to receive an enable signal en and transmit an MA clock signal to the SL receiving module;
the SL receiving module is configured to: after the MA clock signal is received by the SL receiving module, detect a trigger signal of SL; when a start bit of the SL is detected by the SL receiving module, read SL data; and after the SL data is read by the SL receiving module, transmit a done signal to the MA drive module to stop operation of the MA drive module and transmit a did signal to the CRC check module; and
the CRC check module is configured to: perform CRC check on the SL data after the did signal is received by the CRC check module; and output a correct position value after the check is completed,
wherein the SL receiving module comprises:
a signal generation unit configured to: generate a maclk signal based on a time difference between the MA clock signal and an SL signal, and detect the trigger signal of the SL by using a rising edge of the maclk signal.

6. The interface system for BISS protocol decoding according to claim 5, wherein the signal generation unit comprises:
a signal generation sub-unit configured to: generate the maclk signal based on a time difference between a second rising edge of the MA clock signal and a first falling edge of the SL signal, and detect the trigger signal of the SL by using the rising edge of the maclk signal.

7. The interface system for BISS protocol decoding according to claim 6, wherein the SL receiving module further comprises:
a reading unit configured to: when the start bit of the SL is detected, read a level value of the SL and store the level value in a register; and after all bits of the level value of the SL are read, transmit the done signal to the MA drive module to stop the operation of the MA drive module and transmit the did signal to the CRC check module.

8. The interface system for BISS protocol decoding according to claim 7, wherein the CRC check module comprises:
a check unit configured to:
perform the CRC check for correctness of the SL data after the did signal is received; and
output the SL data in a case that the SL data passes the CRC check or output a previous correct data value in a case that the SL data does not pass the CRC check, after the check is completed.

* * * * *